US009922461B2

United States Patent
Yang et al.

(10) Patent No.: US 9,922,461 B2
(45) Date of Patent: Mar. 20, 2018

(54) REALITY AUGMENTING METHOD, CLIENT DEVICE AND SERVER

(71) Applicant: BAIDU ONLINE NETWORK TECHNOLOGY (BEIJING) CO., LTD., Beijing (CN)

(72) Inventors: Chunyong Yang, Beijing (CN); Zhouzhou He, Beijing (CN); Zhengchao Fu, Beijing (CN); Xin Sui, Beijing (CN)

(73) Assignee: Baidu Online Network Technology (Beijing) Co., Ltd., Beijing (CN)

( * ) Notice: Subject to any disclaimer, the term of this patent is extended or adjusted under 35 U.S.C. 154(b) by 0 days.

(21) Appl. No.: 14/570,173

(22) Filed: Dec. 15, 2014

(65) Prior Publication Data

US 2015/0294503 A1    Oct. 15, 2015

(30) Foreign Application Priority Data

Apr. 14, 2014    (CN) .......................... 2014 1 0149033

(51) Int. Cl.
*G06T 19/00* (2011.01)
(52) U.S. Cl.
CPC .................... *G06T 19/006* (2013.01)
(58) Field of Classification Search
CPC ........... G06T 19/006; G06T 11/60; G09G 2340/0464
USPC .................... 345/629, 632, 633, 635
See application file for complete search history.

(56) References Cited

U.S. PATENT DOCUMENTS

| 8,571,851 | B1 | 10/2013 | Tickner et al. | |
|---|---|---|---|---|
| 2012/0306850 | A1 | 12/2012 | Balan et al. | |
| 2013/0083011 | A1* | 4/2013 | Geisner | G09G 5/00 345/419 |
| 2013/0158965 | A1 | 6/2013 | Beckman | |
| 2013/0293468 | A1* | 11/2013 | Perez | G06F 3/033 345/158 |
| 2013/0293530 | A1* | 11/2013 | Perez | G06K 9/00671 345/418 |

(Continued)

FOREIGN PATENT DOCUMENTS

| CN | 103186922 A | 7/2013 |
|---|---|---|
| JP | 2002247602 A | 8/2002 |

(Continued)

OTHER PUBLICATIONS

Chinese patent application No. 201410149033, First search dated Aug. 16, 2016; 2 pages.

(Continued)

*Primary Examiner* — Chante Harrison
(74) *Attorney, Agent, or Firm* — Lathrop Gage LLP

(57) ABSTRACT

A reality augmenting method, a client device and a server are provided. The reality augmenting method includes: obtaining information related to an object to be identified, in which the information includes image information of the object; sending the information to a server, receiving augmented information of the object and display position information of the augmented information returned from the server according to the information; and displaying the augmented information and the image information simultaneously according to the display position information.

12 Claims, 2 Drawing Sheets

(56) References Cited

U.S. PATENT DOCUMENTS

| | | | | |
|---|---|---|---|---|
| 2013/0293577 A1* | 11/2013 | Perez | ............... | G02B 27/017 345/633 |
| 2013/0328927 A1* | 12/2013 | Mount | ............... | G06T 19/006 345/633 |
| 2014/0253589 A1* | 9/2014 | Tout | ............... | G06K 19/06159 345/633 |
| 2014/0267598 A1* | 9/2014 | Drouin | ............... | G03H 1/0005 348/40 |
| 2014/0317659 A1* | 10/2014 | Yasutake | ............... | H04N 21/42209 725/43 |
| 2015/0029219 A1* | 1/2015 | Watanabe | ............... | G06T 7/0044 345/633 |
| 2015/0228123 A1* | 8/2015 | Yasutake | ............... | G06T 19/006 345/633 |
| 2016/0049005 A1* | 2/2016 | Mullins | ............... | G06T 19/006 345/420 |
| 2016/0140761 A1* | 5/2016 | Saunders | ............... | G06T 19/006 345/633 |

FOREIGN PATENT DOCUMENTS

| | | |
|---|---|---|
| JP | 2006091390 A | 4/2006 |
| JP | 2012212343 A | 11/2012 |
| JP | 2013109768 A | 6/2013 |
| JP | 2013200793 A | 10/2013 |
| JP | 2013211027 A | 10/2013 |
| KR | 20110046703 A | 5/2011 |
| KR | 20110133335 A | 12/2011 |
| KR | 20120025211 A | 3/2012 |
| KR | 20130097554 A | 9/2013 |
| KR | 20140029123 A | 3/2014 |
| WO | 2013/117977 A2 | 8/2013 |

OTHER PUBLICATIONS

Chinese patent application No. 201410149033, First Office Action dated Aug. 24, 2016; 18 pages.

Gammeter, S., et al.; Server-side object recognition and client-side object tracking for mobile augmented reality; 2010 IEEE Computer Society Conference on Computer Vision and Pattern Recognition—Workshops; 8 pages.

Hoiem, D., et al.; SOLAR: sound object localization and retrieval in complex audio environments; IEEE International conference on Acoustics, Speech, and Signal Processing; Mar. 18-23, 2005, pp. 429-432.

Shoushtari, Seyed Hesameddin Najafi; "Fast 3D Object Detection and Pose Estimation for Augmented Reality Systems". PhD Dissertation. Jan. 1, 2006 (Jan. 1, 2006), 167 pages.

European patent application No. 14 197 901.3 Search and Opinion dated Sep. 22, 2015; 8 pages.

European patent application No. 14 197 901.3 Office Action dated Mar. 10, 2017; 2 pages.

Japanese patent application No. 2014-256352 Office Action dated Feb. 23, 2016, 8 pages.

Japanese patent application No. 2014-256352 Search Report dated Feb. 15, 2016, 42 pages.

Korean patent application No. 10-2014-0184771 Notice of Preliminary Rejection dated Dec. 17, 2015; 14 pages.

Korean patent application No. 10-2014-0184771 Notification of Final Rejection dated Feb. 23, 2016; 3 pages.

Korean patent application No. 10-2014-0184771 Notification of Final Rejection dated Jun. 21, 2016; 4 pages.

Korean patent application No. 10-2016-0092690 Notice of Preliminary Rejection dated Aug. 4, 2016; 17 pages.

* cited by examiner

REALITY AUGMENTING METHOD, CLIENT DEVICE AND SERVER

CROSS REFERENCE TO RELATED APPLICATION

This application claims priority and benefits of Chinese Patent Application No. 201410149033.2, filed with State Intellectual Property Office on Apr. 14, 2014, the entire content of which is incorporated herein by reference.

FIELD

Embodiments of the present disclosure generally relate to a computer technology field, and more particularly to a reality augmenting method, a client device and a server.

BACKGROUND

Augmented reality (AR) technique is a new technique developed based on virtual reality, which augments the perception of a user on real world via information provided by a computer system, and adds virtual objects, virtual scenes and system instruction information into a real scene, thus implementing reality "augmentation".

Currently, reality augmented contents in an application program using AR technique, such as a social application program, a map application program and the like, are completed by the developer. Specifically, the developer prepares the reality augmented contents based on geo-locations and image mark matches, and seals the reality augmented contents in a software development kit (SDK) of the application program, such that the user can obtain useful information of a desired object according to the reality augmented contents.

Conventional application programs using AR technique, however, may not fully support a mode of reality augmentation based on image identification information, due to a main reason that an effect of the mode based on image identification is poor. Specifically, if a user sends a request to the conventional application program based on an image, even the image can be identified by the application program, useful information of the image cannot be shown, such that the user can obtain the useful information. Therefore, experiences provided by the conventional application program are not ideal.

SUMMARY

Embodiments of the present disclosure seek to solve at least one of the problems existing in the related art to at least some extent.

Accordingly, a first objective of the present disclosure is to provide a reality augmenting method, which may provide a new interaction method for reality augmentation. With the reality augmenting method, augmented information of an object to be identified may be obtained according to image information of the object, and therefore a user may obtain useful information in the object according to the augmented information. The method makes it convenient for the user to know the object to be identified and improves the user experience.

A second objective of the present disclosure is to provide a reality augmenting method.

A third objective of the present disclosure is to provide a client device.

A fourth objective of the present disclosure is to provide a server.

In order to achieve above objectives, embodiments of a first aspect of the present disclosure provides a reality augmenting method. The reality augmenting method according to embodiments of the present disclosure includes: obtaining information related to an object to be identified, in which the information includes image information of the object; sending the information to a server, receiving augmented information of the object and display position information of the augmented information returned from the server according to the information; and displaying the augmented information and the image information simultaneously according to the display position information.

With the reality augmenting method according to embodiments of the present disclosure, information related to an object to be identified is sent to a server, augmented information of the object and display location information of the augmented information returned from a server is received, and the image information and augmented information of the object are displayed simultaneously. In this way, a user may obtain useful information in the object via the augmented information, thus making it convenient for the user to know the object to be identified.

Embodiments of a second aspect of the present disclosure provide a reality augmenting method. The reality augmenting method according to embodiments of the present disclosure includes: receiving information related to a first object to be identified sent by a client, in which the information includes image information of the first object; identifying the information and obtaining an identified result, and generating augmented information of the first object and display position information of the augmented information according to the identified result; and returning the augmented information and the display location information to the client such that the client displays the augmented information and the image information simultaneously according to the display location information.

With the reality augmenting method according to embodiments of the present disclosure, information related to a first object to be identified sent by a client is received, the information is identified, an identified result is obtained, augmented information of the first object and display location information of the augmented information are generated according to the identified result, and the augmented information and the display location information are sent to the client. Therefore, a new interaction mode for reality augmentation is provided, which enables the client to obtain the augmented information of the first object to be identified. In this way, a user may obtain useful information in the object via the augmented information, thus making it convenient for the user to know the first object to be identified.

Embodiments of a third aspect of the present disclosure provide a client device. The client device according to embodiments of the present disclosure includes: an obtaining module configured to obtain information related to an object to be identified, in which the information includes image information of the object; a communication module configured to send the information to a server, to receive augmented information of the object and display position information of the augmented information returned from the server according to the information; and a display module configured to display the augmented information and the image information simultaneously according to the display position information.

With the client device according to embodiments of the present disclosure, the obtaining module obtains information related to an object to be identified, the communication module sends the information to the server and receives augmented information of the object and display location information of the augmented information returned from the server, and the display module displays the image information and augmented information of the object simultaneously. In this way, a user may obtain useful information in the object via the augmented information, thus making it convenient for the user to know the object to be identified.

Embodiments of a fourth aspect of the present disclosure provide a server. The server according to embodiments of the present disclosure includes: a receiving module configured to receive information related to a first object to be identified sent by a client, in which the information includes image information of the first object; a processing module configured to identify the information to obtain an identified result, to generate augmented information of the first object and display position information of the augmented information according to the identified result; and a returning module configured to return the augmented information and the display location information to the client such that the client displays the augmented information and the image information according to the display location information.

With the server according to embodiments of the present disclosure, the receiving module receives information related to a first object to be identified sent by a client, the processing module identifies the information, obtains an identified result and generates augmented information of the first object and display location information of the augmented information according to the identified result, and the returning module sends the augmented information and the display location information to the client. Therefore, a new interaction mode for reality augmentation is provided, which enables the client to obtain the augmented information of the first object to be identified. In this way, a user may obtain useful information in the object via the augmented information, thus making it convenient for the user to know the first object to be identified.

Additional aspects and advantages of embodiments of present disclosure will be given in part in the following descriptions, become apparent in part from the following descriptions, or be learned from the practice of the embodiments of the present disclosure.

BRIEF DESCRIPTION OF THE DRAWINGS

These and other aspects and advantages of embodiments of the present disclosure will become apparent and more readily appreciated from the following descriptions made with reference to the accompanying drawings, in which.

DETAILED DESCRIPTION

Figure 1:
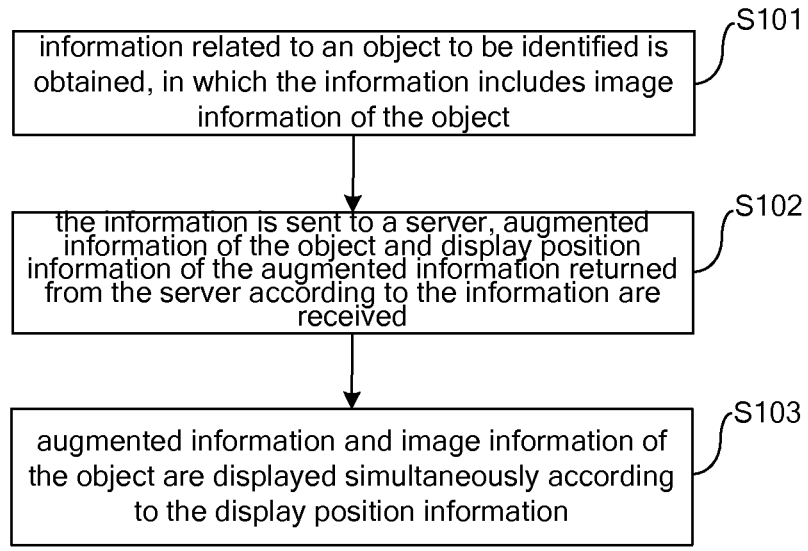
FIG. 1 is a flow chart showing a reality augmenting method according to an embodiment of the present disclosure.

Reference will be made in detail to embodiments of the present disclosure. Embodiments of the present disclosure will be shown in drawings, in which the same or similar elements and the elements having same or similar functions are denoted by like reference numerals throughout the descriptions. The embodiments described herein according to drawings are explanatory and illustrative, not construed to limit the present disclosure.

A reality augmenting method, a client device and a server according to embodiments of the present disclosure will be described below in detail with reference to the drawings.

FIG. 1 is a flow chart showing a reality augmenting method according to an embodiment of the present disclosure. This embodiment will be described at a client side. As shown in FIG. 1, the reality augmenting method according to embodiments of the present disclosure includes the following steps.

At step S101, information related to an object to be identified is obtained, in which the information includes image information of the object.

In some embodiments, the client may be a mobile terminal or a wearable device such as a reality augmentation glass. The mobile terminal may be any hardware devices having various operation systems, such as a cellphone, a tablet computer, etc.

In some embodiments, the information of the object to be identified further includes at least one of sound information, position information of the object to be identified, and various data obtainable by a sensor.

In some embodiments, after being turned on, the client may obtain the image information of the object to be identified by using a camera, obtain the sound information of the object to be identified by using a sound collecting device, and obtain the position information of the object to be identified by using a position collecting module.

At step S102, the information is sent to a server, augmented information of the object and display position information of the augmented information returned from the server according to the information are received.

In some embodiments, the augmented information of the object to be identified may include, but may not be limited to, at least one of recommendation information, sound information, and geographic service information.

In some embodiments, after receiving the image information, sound information and position information of the object to be identified, the client may preprocess the information to obtain a processed information, such as dividing and/or compressing the image information, denoising and/or filtering the sound information, so as to improve an efficiency of a server to return the augmented information according to the processed information.

In some embodiments, the client sends the processed information to a server after preprocessing the information. After receiving the information of the object to be identified, the server identifies the information, obtains an identified result, generates augmented information of the object to be identified and display position information of the augmented information according to the identified result, and returns the augmented information and the display position information to the client.

In some embodiments, the display position information of the augmented information may include a position which is preset in the image information of the object to be identified by the server and is capable of showing the augmented information.

At step S103, augmented information and image information of the object are displayed simultaneously according to the display position information.

In some embodiments, the client receives the augmented information and the display position information returned from the server, renders and overlays the augmented information into the image information obtained by the client in a predetermined mode. For example, the augmented information and the image information may be displayed in a front-projected holographic display mode which enables the augmented information displayed in the image information to have a three-dimensional space feeling. In this way, the augmented information and the image information may be displayed simultaneously, thus enhancing a reality of the image information and making it convenient for the user to know the object to be identified.

In some embodiments, for example, the reality augmented method is used to obtain augmented information of the Forbidden City in Beijing, China based on image information and geographic information of the Forbidden City. Firstly, the image information is obtained on a client. The client preprocesses the image information (including dividing and compressing the image information) to obtain a processed image information, and sends the processed image information and geographic information to a server. After receiving the image information and the geographic information of an object to be identified (i.e. the Forbidden City) sent from the client, the server firstly detects the type of the object to be identified and determines that the object is a scene, and then identifies the geographic information firstly and identifies the image information later. Specifically, firstly the geographic information of the object to be identified is identified to obtain position information of the object, and then the image information is identified according to an image identification model in the server so as to obtain brief information corresponding to the image information. Then, detailed information and recommendation data of the image information are obtained from an information source system according to the brief information. The position information, detailed information, and recommendation data of the image information are augmented information of the image information of the Forbidden City. After obtaining the augmented information of the image information of the Forbidden City, the server provides display position information of the augmented information, and returns the augmented information and the display position information to the client. Finally, the client displays the image information and the augmented information of the Forbidden City simultaneously. In some embodiments, the server may obtain an audio file corresponding to the image information of the Forbidden City from a local information source. The audio file may include an audio introduction of a scene or an object in the image information of the Forbidden City. With the audio introduction, the user may learn information related to scenes or objects in the Forbidden City much better.

In some embodiments, for example, the reality augmenting method is used to obtain augmented information of a dog base on image information and sound information of the dog. Firstly, the image information and the sound information of the dog are uploaded to a server via a client. The server receives the image information and the sound information of an object to be identified (i.e. the dog) sent from the client, and firstly detects the type of the object and determines that the object is an animal, and then identifies the sound information first and identifies the image information later. Specifically, the sound information is identified according to a locally stored sound identification model, so as to obtain a species of the dog corresponding to the sound information. Then, the image information is identified according to a locally stored image identification model, so as to obtain brief information corresponding to the image information, such as a title of the dog. Augmented information including detailed information and recommendation data, such as a character of the dog, keeping tips, pet hospitals nearby and the like, may be obtained from an information source system according to the brief information. Display position information of the augmented information is provided in connection with the image information, and the augmented information and the display position information are sent to the client. The client finally displays the image information and augmented information of the user simultaneously. In this way, the user may have more complete knowledge about dogs, thus making it convenient for the user to keep dogs.

In some embodiments, for example, after obtaining the image information of a vehicle, the server may return augmented information (such as famous cars, prices, performances, related purchase recommendation data and the like) and display position information to the client, and therefore the user may have a more complete knowledge of the vehicle according to the augmented information shown in the client and a user experience may be improved.

With the reality augmenting method according to embodiments of the present disclosure, information related to an object to be identified is sent to a server, augmented information of the object and display location information of the augmented information returned from a server is received, and the image information and augmented information of the object are displayed simultaneously. In this way, a user may obtain useful information in the object via the augmented information, thus making it convenient for the user to know the object to be identified.

Figure 2:
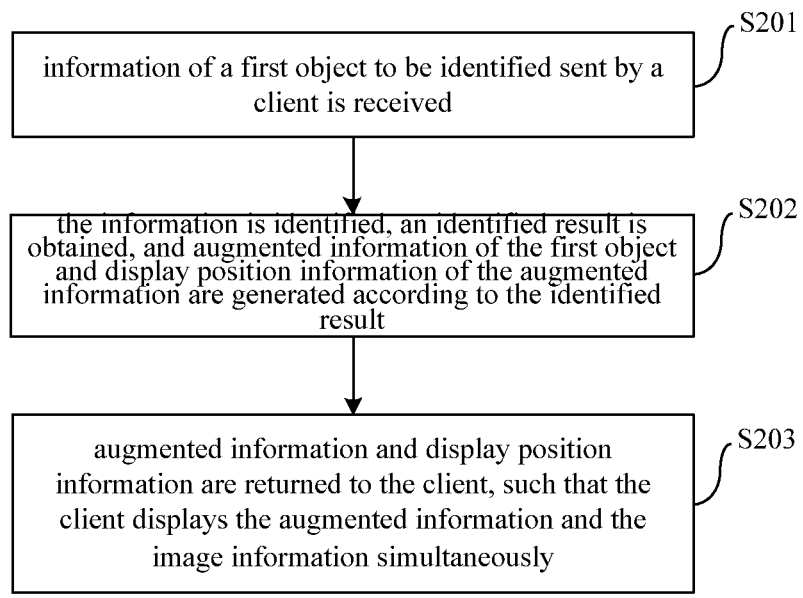
FIG. 2 is a flow chart showing a reality augmenting method according to an embodiment of the present disclosure.

FIG. 2 is a flow chart showing a reality augmenting method according to an embodiment of the present disclosure. This embodiment will be described at a server side. As shown in FIG. 2, the reality augmenting method according to embodiments of the present disclosure includes the following steps.

At step S201, information of a first object to be identified sent by a client is received.

In some embodiments, the server may receive not only image information of the object to be identified sent by the client, but also at least one of sound information and position information of the object to be identified, and data obtainable from various sensor.

At step S202, the information is identified, an identified result is obtained, and augmented information of the first object and display position information of the augmented information are generated according to the identified result.

In some embodiments, the information may be identified using identifying models in series/parallel. In some embodiments, the information is identified using identifying models in series. In the present embodiment, firstly type information of the object to be identified is obtained, and a sequence of identifying models to be used is determined according to the type information, and then the information is identified using the identifying models according to the sequence, and finally the identified result is obtained. For example, firstly sound information of an object to be identified is identified, and image information of the object is identified after identifying that the object is of a certain type (for example, a certain probability is reached), and then the image information is further identified based on the identified certain type, thus increasing the identifying probability. If a category of the object is determined without identifying a specific title (for example, identification) of the object, sound information or other information of the object are identified in the determined category, so as to obtain the identified result. In some embodiments, the information is identified using identifying models in parallel, and then the identified result is obtained. For example, identification of the information may be performed by carrying out a model training according to a linear formula Y=ax1+bx2+cx3 . . . , in which Y represents a final identifying probability of the object to be identified, x1 represents an identifying probability using a sound identifying model, x2 represents an identifying probability using an image identifying probability, x3 represents an identifying probability using a position identifying model, a, b, and c represent coefficients corresponding to identifying models according to historical data. The linear formula is used in the present embodiment only for example, and quadratic formulae or more complex formulae may be used in embodiments of the present disclosure. In some embodiments, the information may be identified using identifying models in parallel in combination with identifying models in series. In this way, both the identifying probability and the identifying accuracy may be improved.

It is to be noted that, identifying the information using identifying models in parallel or in series described above may be an algorithm which the server uses during an integration process. It is known to a person with ordinary skill in the art that, the server has communication functions and the server may perform an identification using the above exemplary algorithm on the basis of the communication functions.

In some embodiments, after obtaining the information related to the first object to be identified sent from the client, the server obtains type information of the first object to be identified according to the information related to the first object to be identified. The type information may include, but may not be limited to, an animal type, a scene type, and so on. After obtaining the type information of the first object to be identified, the information is identified in an identifying mode determined according to the type information, and the identified result is obtained. In some embodiments, a sequence of information related to the first object to be identified is determined according to the type information, and the first object is identified according to the sequence, and then the identified result is obtained.

In some embodiments, the information is identified in the identifying mode and according to information obtained from a local information source, and the identified result is obtained. The local information source may be established based on at least one of Baidu Encyclopedia, search recommendation data and the like.

In some embodiments, in identifying image information of a first object, if determining that the image information of the first object includes a plurality of second objects, the image information is divided so as to obtain each second object and a position of each second object in the image information, and each second object and the position of each second object are identified, and then a title, an identifying probability and position information of each second object in the image information are obtained.

In some embodiments, the identified result is obtained according to a title and position information of a current second object, when determining the identifying probability of the current second object is larger than a preset threshold. In some embodiments, a current second object is re-identified using another identifying model, when determining the identifying probability of the current second object is smaller than the preset threshold, i.e. the identifying model currently used is not suitable, until the identifying probability of the current second object is larger than the preset threshold.

In some embodiments, associated information of the first object to be identified is obtained from the local information source according to the identified result, after obtaining the identified result. Then, the associated information and the identified result are integrated, and the augmented information of the first object is generated.

In some embodiments, the reality augmentation method according to embodiments of the present disclosure may be used to obtain augmented information of image information including two dog images. The details of the present embodiment will be described in the following.

In the present embodiment, firstly the server divides the image information, obtains two dog images and positions of the dog images in the image information, and the two dog images are identified according to the positions of the dog images, for example, according to a sequence from left to right. For example, a left dog image is identified according to a local image identifying model, and an identifying probability is obtained. If the identifying probability is larger than a preset threshold such as 80%, it is determined that a title of the left dog image is a title corresponding to the current image identifying model. If the identifying probability is smaller than the preset threshold such as 80%, the left dog image is re-identified using another image identifying mode, until the identifying probability of the left dog image is larger than the preset threshold such as 80%, and then the title of the left dog image is determined according to the current image identifying model. After determining the title of the left dog image, associated information of the left dog image, such as characters of the dog, keeping tips, and pet hospitals nearby, etc., is obtained from the local information source, the associated information and the identified result (for example, the title of the dog image to be identified) are integrated, and augmented information of the dog is generated.

After obtaining augmented information of the left dog image in the image information, augmented information of the right dog image may be obtained by using a process similar to that described above.

At step S203, augmented information and display position information are returned to the client, such that the client displays the augmented information and the image information simultaneously. Therefore, the reality augmentation may be achieved.

According to some embodiments of the present disclosure, after obtaining augmented information in the image information, the augmented information is returned to the client, the client receives the augmented information, renders and overlays the augmented information into the image information obtained by the client in a predetermined manner, and the augmented information and the image information may be displayed in a front-projected holographic display mode. In this way, the client may display the augmented information and the image information simultaneously, thus enhancing a reality of the image information and making it convenient for the user to know the object to be identified.

With the reality augmenting method according to embodiments of the present disclosure, the information is processed integrally by simulating human brains, and therefore the identifying probability for the first object to be identified is improved. Image identification may be important in the reality augmenting method, and identifications may be performed by using various different identifying models in series and/or parallel. Therefore, the identifying probability is greatly increased, useful information sources are integrated, and applications for reality augmentation may be prepared accordingly.

With the reality augmenting method according to embodiments of the present disclosure, information related to a first object to be identified sent by a client is received, the information is identified, an identified result is obtained, augmented information of the first object and display location information of the augmented information are generated according to the identified result, and the augmented information and the display location information are sent to the client. Therefore, a new interaction mode for reality augmentation is provided, which enables the client to obtain the augmented information of the first object to be identified. In this way, a user may obtain useful information in the object via the augmented information, thus making it convenient for the user to know the first object to be identified.

Embodiments of the present disclosure further provide a client device. The client device may be positioned in a mobile terminal, a wearable device such as reality augmentation glass, and the like. The mobile terminal includes hardware devices having various operation systems, such as a mobile phone, a tablet computer, and so on.

Figure 3:
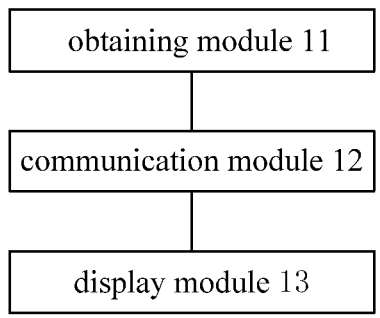
FIG. 3 is a schematic diagram of a client device according to an embodiment of the present disclosure.

FIG. 3 is a schematic diagram of a client device according to an embodiment of the present disclosure.

As shown in FIG. 3, the client device includes an obtaining module 11, a communication module 12 and a display module 13.

The obtaining module 11 is configured to obtain information related to an object to be identified.

In some embodiments, the information related to the object to be identified includes image information of the object.

In some embodiments, the information related to the object to be identified further includes sound information and position information of the object, and various data obtainable by a sensor.

In some embodiments, in order to obtain the information related to the object to be identified, the obtaining module 11 may further include at least one of the following units, such as an image collecting unit, a sound collecting unit and a position collecting unit. The image collecting unit is configured to obtain image information of the object, the sound collecting unit is configured to obtain sound information of the object, and the position collecting unit is configured to obtain position information of the object.

The communication module 12 is configured to send the information to a server, to receive augmented information of the object and display position information of the augmented information returned from the server according to the information.

In some embodiments, the augmented information may include, but may not be limited to, recommendation information, sound information, and geographic service information.

The communication module 12 is configured to preprocess the information to obtain processed information, and send the processed information to the server. In some embodiments, after the obtaining module 11 obtains the image information, the sound information and the position information of the object, the communication module 12 may preprocess the information respectively. For example, the communication module 12 may preprocess the information by dividing and compressing the image information of the object and by denoising and filtering the sound information of the object.

The communication module 12 is configured to send the processed information to the server after preprocessing the information related to the object. In some embodiments, after receiving the information related to the object, the server identifies the information, obtains an identified result, generates augmented information of the object according to the identified result, further provides display position information of the augmented information, and returns the augmented information and the display position information of the augmented information to the client device. The communication module 12 receives the augmented information and the display position information returned from the server.

The display module 13 is configured to display the augmented information and the image information of the object simultaneously according to the display position information. Therefore, the reality augmentation may be achieved.

The display module 13 is configured to display the augmented information and the image information simultaneously in a predetermined mode. In some embodiments, after the communication module 12 receives the augmented information and the display position information returned from the server, the display module 13 renders and overlays the augmented information into the image information obtained by the client in the predetermined mode. For example, the display module 13 may display the augmented information and the image information in a front-projected holographic display mode which enables the augmented information displayed in the image information to have a three-dimensional space feeling. In this way, the display module 13 displays the augmented information and the image information simultaneously, thus enhancing a reality of the image information and making it convenient for the user to know the object to be identified.

Concerning a reality augmentation process of the client device including the obtaining module 11, the communication module 12 and the display module 13, reference is made to the reality augmenting method described in FIG. 1, and thus details thereof are omitted herein.

With the client device according to embodiments of the present disclosure, the obtaining module obtains information related to an object to be identified, the communication module sends the information to the server and receives augmented information of the object and display location information of the augmented information returned from the server, and the display module displays the image information and augmented information of the object simultaneously. In this way, a user may obtain useful information in the object via the augmented information, thus making it convenient for the user to know the object to be identified.

Embodiments of the present disclosure further provide a server.

Figure 4:
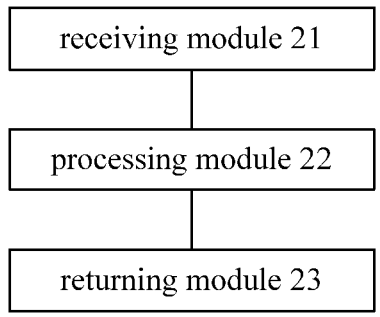
FIG. 4 is a schematic diagram of a server according to an embodiment of the present disclosure.

FIG. 4 is a schematic diagram of a server according to an embodiment of the present disclosure.

As shown in FIG. 4, the server includes a receiving module 21, a processing module 22 and a returning module 23.

The receiving module 21 is configured to receive information related to a first object to be identified sent by a client, in which the information includes image information of the first object.

The receiving module 21 is configured to receive sound information and position information of the first object, and data obtainable by a sensor, in addition to the image information of the first object sent from the server.

The processing module 22 is configured to identify the information received by the receiving module 21 to obtain an identified result, to generate augmented information of the first object and display position information of the augmented information according to the identified result.

The returning module 23 is configured to return the augmented information and the display location information to the client such that the client displays the augmented information and the image information according to the display location information simultaneously. Therefore, reality augmentation may be realized.

Figure 5:
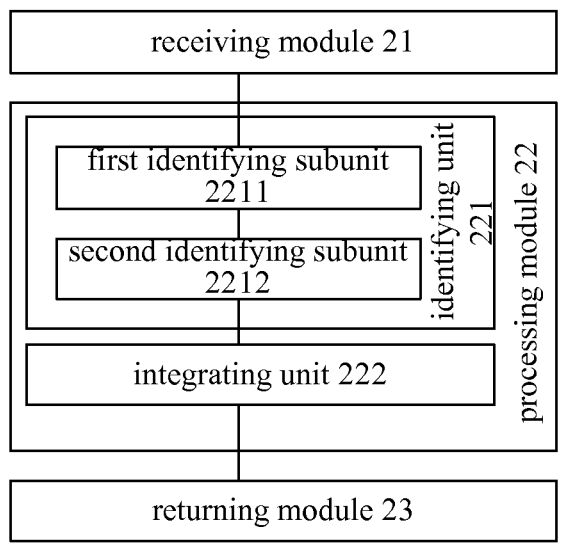
FIG. 5 is a schematic diagram of a server according to another embodiment of the present disclosure.

In some embodiments, the processing module 22 includes an identifying unit 221 and an integrating unit 222, as shown in FIG. 5.

The identifying unit 221 is configured to obtain type information corresponding to the first object, to determine a sequence of identifying models to be used according to the type information, to identify the information using a corresponding identifying model according to the sequence and/or to identify the information using parallel corresponding identifying models, and to obtain the identified result. The integrating unit 222 is configured to obtain associated information of the first object from a local information source according to the identified result, to integrate the associated information and the identified result, and to generate the augmented information of the first object.

In some embodiments, after the receiving module 21 receives the associated information sent from the client, the identifying unit 221 obtains the type information of the first object according to the associated information of the first object, and the type information may include, but may not be limited to, animals, scenes and so on. After obtaining the type information, the identifying unit 221 may identify the associated information using the identifying models according to the sequence and/or using the identifying models in parallel and in combination with information from a local information source, and obtains the identified result.

In some embodiments, the identifying unit 221 includes a first identifying subunit 2211 and a second identifying subunit 2212. The first identifying subunit 2211 is configured to identify the image information of the first object and to obtain a plurality of second objects to be identified in the image information, a title of each second object, an identifying probability of each second object, and location information of each second object. The second identifying subunit 2212 is configured to obtain the identified result according to the title and the position information of a current second object when determining that an identifying probability of the current second object is larger than a preset threshold. The second identifying subunit 2212 is further configured to re-identify a current second object when determining that an identifying probability of the current second object is smaller than the preset threshold, until the identifying probability of the current second object is larger than the preset threshold.

Concerning a reality augmentation process of the server including the receiving module 21, the processing module 22 and the returning module 23, reference is made to the reality augmenting method described in FIG. 2, and thus details thereof are omitted herein.

With the server according to embodiments of the present disclosure, the receiving module receives information related to a first object to be identified sent by a client, the processing module identifies the information, obtains an identified result and generates augmented information of the first object and display location information of the augmented information according to the identified result, and the returning module sends the augmented information and the display location information to the client. Therefore, a new interaction mode for reality augmentation is provided, which enables the client to obtain the augmented information of the first object to be identified. In this way, a user may obtain useful information in the first object via the augmented information, thus making it convenient for the user to know the first object to be identified.

It is understood that each part of the present disclosure may be realized by the hardware, software, firmware or their combination. In the above embodiments, a plurality of steps or methods may be realized by the software or firmware stored in the memory and executed by the appropriate instruction execution system. For example, if it is realized by the hardware, likewise in another embodiment, the steps or methods may be realized by one or a combination of the following techniques known in the art: a discrete logic circuit having a logic gate circuit for realizing a logic function of a data signal, an application-specific integrated circuit having an appropriate combination logic gate circuit, a programmable gate array (PGA), a field programmable gate array (FPGA), etc.

Reference throughout this specification to "an embodiment," "some embodiments," "an example," "a specific example," or "some examples," means that a particular feature, structure, material, or characteristic described in connection with the embodiment or example is included in at least one embodiment or example of the present disclosure. The appearances of the phrases throughout this specification are not necessarily referring to the same embodiment or example of the present disclosure. Furthermore, the particular features, structures, materials, or characteristics may be combined in any suitable manner in one or more embodiments or examples.

In addition, terms such as "first" and "second" are used herein for purposes of description and are not intended to indicate or imply relative importance or significance or impliedly indicate quantity of the technical feature referred to. Thus, the feature defined with "first" and "second" may comprise one or more this feature. In the description of the present disclosure, "a plurality of" means two or more than two this features, unless specified otherwise.

Although explanatory embodiments have been shown and described, it would be appreciated by those skilled in the art that the above embodiments cannot be construed to limit the present disclosure, and changes, alternatives, and modifications can be made in the embodiments without departing from spirit, principles and scope of the present disclosure.

What is claimed is:

1. A reality augmenting method, executed by an instruction execution system of a terminal, and comprising:

obtaining, by the instruction execution system via an input device of the terminal, information related to a first object to be identified, wherein the information comprises image information of the first object, sound information of the first object, and position information of the first object;

sending, by the instruction execution system, the information to a server, receiving, by the instruction execution system, augmented information of the first object and display position information of the augmented information returned from the server according to the information, wherein the server is configured to identify the information and to obtain an identified result, and to generate augmented information of the first object and display position information of the augmented information according to the identified result, and the server is further configured to identify the information by acts of obtaining type information corresponding to the first object,
determining a sequence of identifying models to be used according to the type information,
identifying the information using the identifying models according to the sequence and obtaining the identified result, and/or
identifying the information using the identifying models in parallel and obtaining the identified result, in which the identifying model comprises at least one of an image information identifying model, a sound information identifying model and a position information identifying model, and the server is further configured to identify the information using the identifying models and to obtain an identified result by acts of: identifying image information of the first object and obtaining a plurality of second objects to be identified in the image information, a title of each second object, an identifying probability of each second object, and location information of each second object, and obtaining the identified result according to the title and the position information of a current second object when determining that an identifying probability of the current second object is larger than a preset threshold, and re-identifying a current second object when determining that an identifying probability of the current second object is smaller than the preset threshold, until the identifying probability of the current second object is larger than the preset threshold, wherein the identifying probability is a weighted sum of a first probability corresponding to the image information identifying model, a second probability corresponding to the sound information identifying model and a third probability corresponding to the position information identifying model; and displaying, by the instruction execution system, the augmented information and the image information simultaneously according to the display position information.

2. The method according to claim 1, wherein sending, by the instruction execution system, the information to a server comprises:
preprocessing, by the instruction execution system, the information to obtain processed information and sending, by the instruction execution system, the processed information to the server.

3. The method according to claim 1, wherein displaying, by the instruction execution system, the augmented information and the image information simultaneously according to the display position information comprises:
displaying, by the instruction execution system, the augmented information and the image information simultaneously in a predetermined mode comprising a front-projected holographic display mode.

4. A reality augmenting method executed by an instruction execution system of the server, and comprising:
receiving, by the instruction execution system, information related to a first object to be identified sent by a client device, wherein the information comprises image information of the first object, sound information of the first object and location information of the first object;
identifying, by the instruction execution system, the information;

obtaining, by the instruction execution system, an identified result;
generating, by the instruction execution system, augmented information of the first object and display position information of the augmented information according to the identified result; and
returning, by the instruction execution system, the augmented information and the display position information to the client device such that the client device displays the augmented information and the image information simultaneously according to the display position information,
wherein
identifying, by the instruction execution system, the information comprises:
obtaining, by the instruction execution system, type information corresponding to the first object,
determining, by the instruction execution system, a sequence of identifying models to be used according to the type information, identifying, by the instruction execution system, the information using the identifying models according to the sequence, and obtaining, by the instruction execution system, the identified result; and/or
identifying, by the instruction execution system, the information using the identifying models in parallel, and obtaining, by the instruction execution system, the identified result, in which the identifying model comprise at least one of an image information identifying model, a sound information identifying model and a position information identifying model,
wherein identifying, by the instruction execution system, the information using the identifying models, and obtaining, by the instruction execution system, an identified result comprises:
identifying, by the instruction execution system, image information of the first object, and obtaining, by the instruction execution system, a plurality of second objects to be identified in the image information, a title of each second object, an identifying probability of each second object, and location information of each second object; and
obtaining, by the instruction execution system, the identified result according to the title and the position information of a current second object when determining that an identifying probability of the current second object is larger than a preset threshold;
re-identifying, by the instruction execution system, a current second object when determining that an identifying probability of the current second object is smaller than the preset threshold, until the identifying probability of the current second object is larger than the preset threshold, wherein the identifying probability is a weighted sum of a first probability corresponding to the image information identifying model, a second probability corresponding to the sound information identifying model and a third probability corresponding to the position information identifying model.

5. The method according to claim 4, wherein generating, by the instruction execution system, augmented information of the first object according to the identified result comprises:
obtaining, by the instruction execution system, associated information of the first object from a local information source according to the identified result, integrating, by the instruction execution system, the associated information and the identified result, and generating, by the instruction execution system, the augmented information.

6. The method according to claim 4, wherein
when identifying, by the instruction execution system, the information using the identifying models according to the sequence, and obtaining, by the instruction execution system, the identified result comprises:
identifying, by the instruction execution system, the information using the identifying models according to the sequence and in combination with information obtained from the local information source, and obtaining, by the instruction execution system, the identified result; and
when identifying, by the instruction execution system, the information using the identifying models in parallel and obtaining, by the instruction execution system, the identified result comprises:
identifying, by the instruction execution system, the information using the identifying models in parallel and in combination with information obtained from the local information source, and obtaining, by the instruction execution system, a search result.

7. A client device, comprising:
a processor;
a memory configured to store an instruction executable by the processor;
wherein the processor is configured to:
obtain, via an obtaining module of the client device, information related to a first object to be identified, wherein the information comprises image information of the first object, sound information of the first object and location information of the first object;
send the information to a server, receive augmented information of the first object and display position information of the augmented information returned from the server according to the information, wherein
the server is configured to identify the information and to obtain an identified result, and to generate augmented information of the first object and display position information of the augmented information according to the identified result, and
the server is further configured to identify the information by acts of obtaining type information corresponding to the first object, determining a sequence of identifying models to be used according to the type information, and identifying the information using the identifying models according to the sequence and obtaining the identified result, and/or identifying the information using the identifying models in parallel and obtaining the identified result, in which the identifying model comprise at least one of an image information identifying model, a sound information identifying model and a position information identifying model, and
the server is further configured to identify the information using the identifying models and to obtain an identified result by acts of: identifying image information of the first object and obtaining a plurality of second objects to be identified in the image information, a title of each second object, an identifying probability of each second object, and location information of each second object, and obtaining the identified result according to the title and the position information of a current second object when determining that an identifying probability of the current second object is larger than a preset threshold, and re-identifying a current second object when determining that an identifying probability of the current second object is smaller than the preset threshold, until the identifying probability of the current second object is larger than the preset threshold, wherein the identifying probability is a weighted sum of a first probability corresponding to the image information identifying model, a second probability corresponding to the sound information identifying model and a third probability corresponding to the position information identifying model; and
display the augmented information and the image information simultaneously according to the display position information.

8. The client device according to claim 7, wherein the processor is configured to preprocess the information to obtain processed information, and send the processed information to the server.

9. The client device according to claim 7, wherein the processor is configured to display the augmented information and the image information simultaneously in a predetermined mode including a front-projected holographic display mode.

10. A server, comprising:
a processor;
a memory configured to store an instruction executable by the processor;
wherein the processor is configured to:
receive information related to a first object to be identified sent by a client device, wherein the information comprises image information of the first object, sound information of the first object and location information of the first object;
identify the information to obtain an identified result, generate augmented information of the first object and display position information of the augmented information according to the identified result; and
return the augmented information and the display position information to the client device such that the client device displays the augmented information and the image information according to the display position information, wherein
the processor is configured to identify the information by acts of:
obtaining type information corresponding to the first object, determining a sequence of identifying models to be used according to the type information, identifying the information using the identifying models according to the sequence and obtaining the identified result; and/or
identifying the information using the identifying models in parallel and obtaining the identified result, in which the identifying model comprise at least one of an image information identifying model, a sound information identifying model and a position information identifying model,
wherein the processor is configured to identify the information using the identifying models and obtain an identified result by acts of:
identifying image information of the first object, and obtaining a plurality of second objects to be identified in the image information, a title of each second object, an identifying probability of each second object, and location information of each second object; and
obtaining the identified result according to the title and the position information of a current second object when determining that an identifying probability of the current second object is larger than a preset threshold;

re-identifying a current second object when determining that an identifying probability of the current second object is smaller than the preset threshold, until the identifying probability of the current second object is larger than the preset threshold, wherein the identifying probability is a weighted sum of a first probability corresponding to the image information identifying model, a second probability corresponding to the sound information identifying model and a third probability corresponding to the position information identifying model.

11. The server according to claim 10, wherein the processor is configured to:

obtain associated information of the first object from a local information source according to the identified result, integrate the associated information and the identified result, and generate the augmented information.

12. The server according to claim 11, wherein the processor is configured to identify the information using the identifying models according to the sequence and in combination with information obtained from the local information source, and obtain the identified result; and/or identify the information using the identifying models in parallel and in combination with information obtained from the local information source, and obtain a search result.

* * * * *